Figure 5:
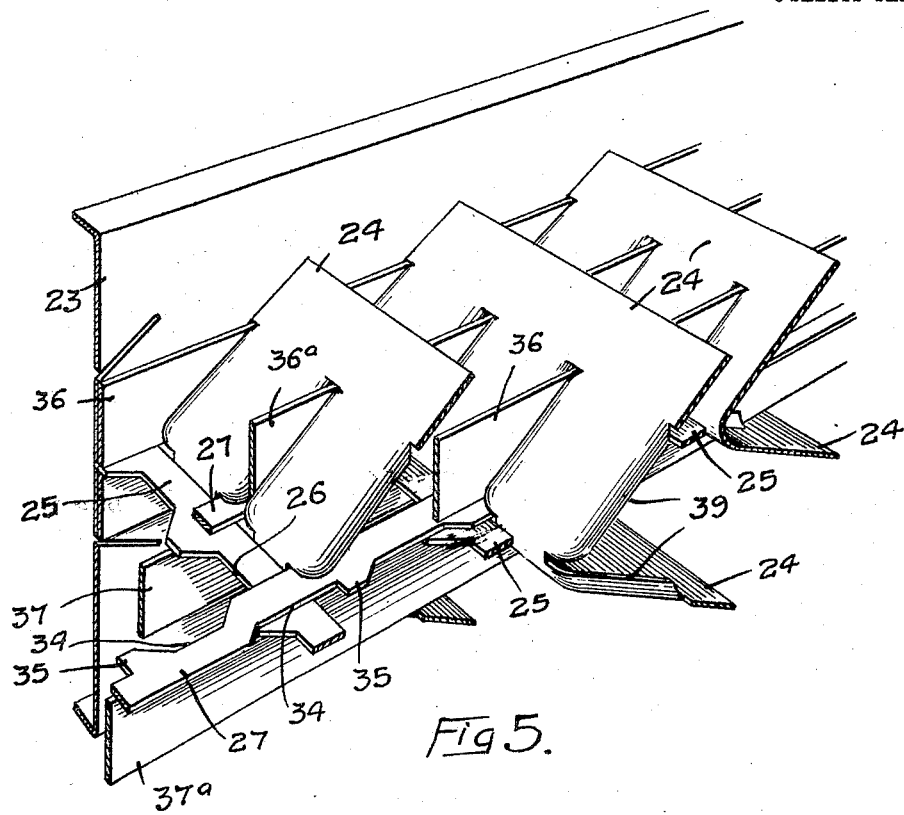

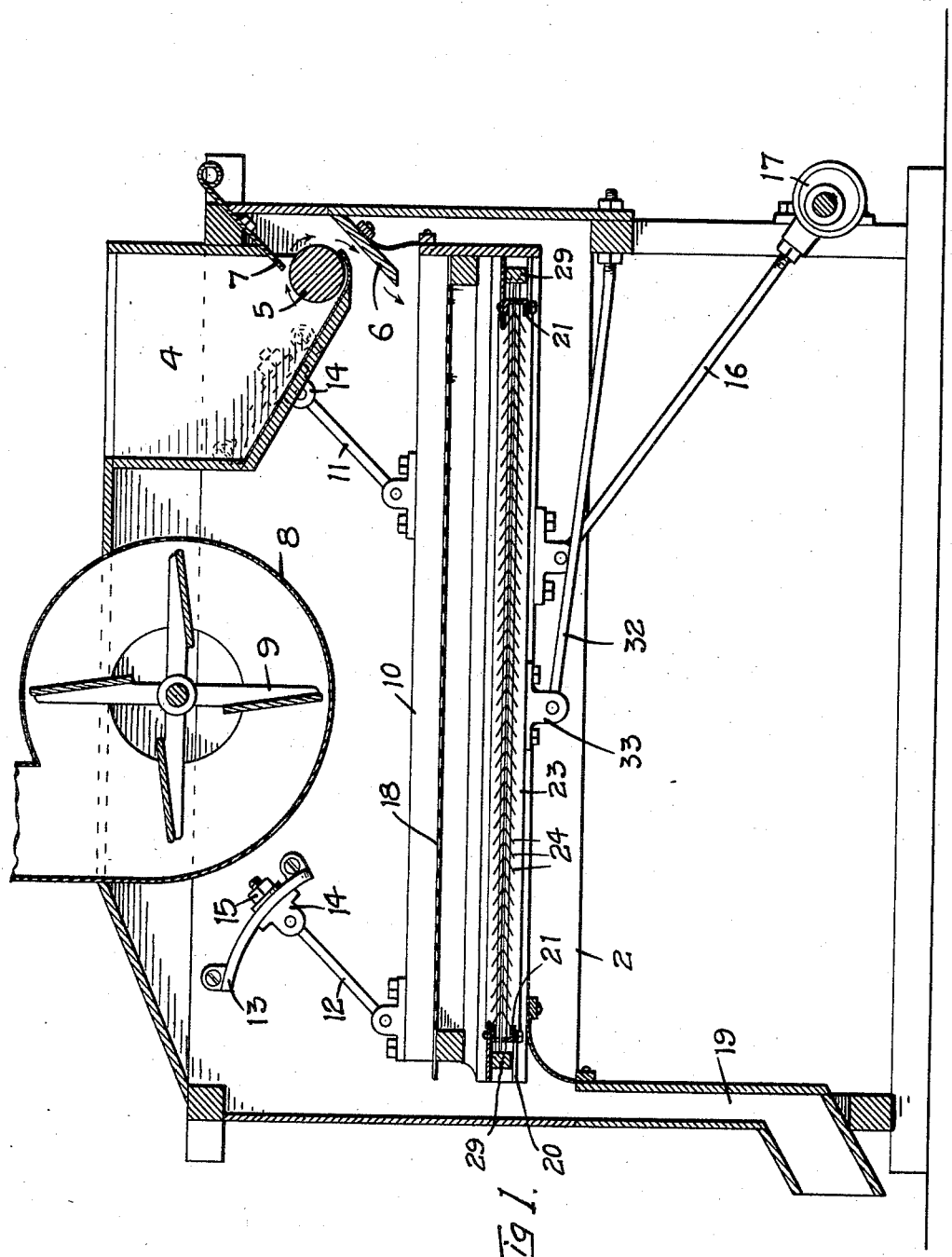

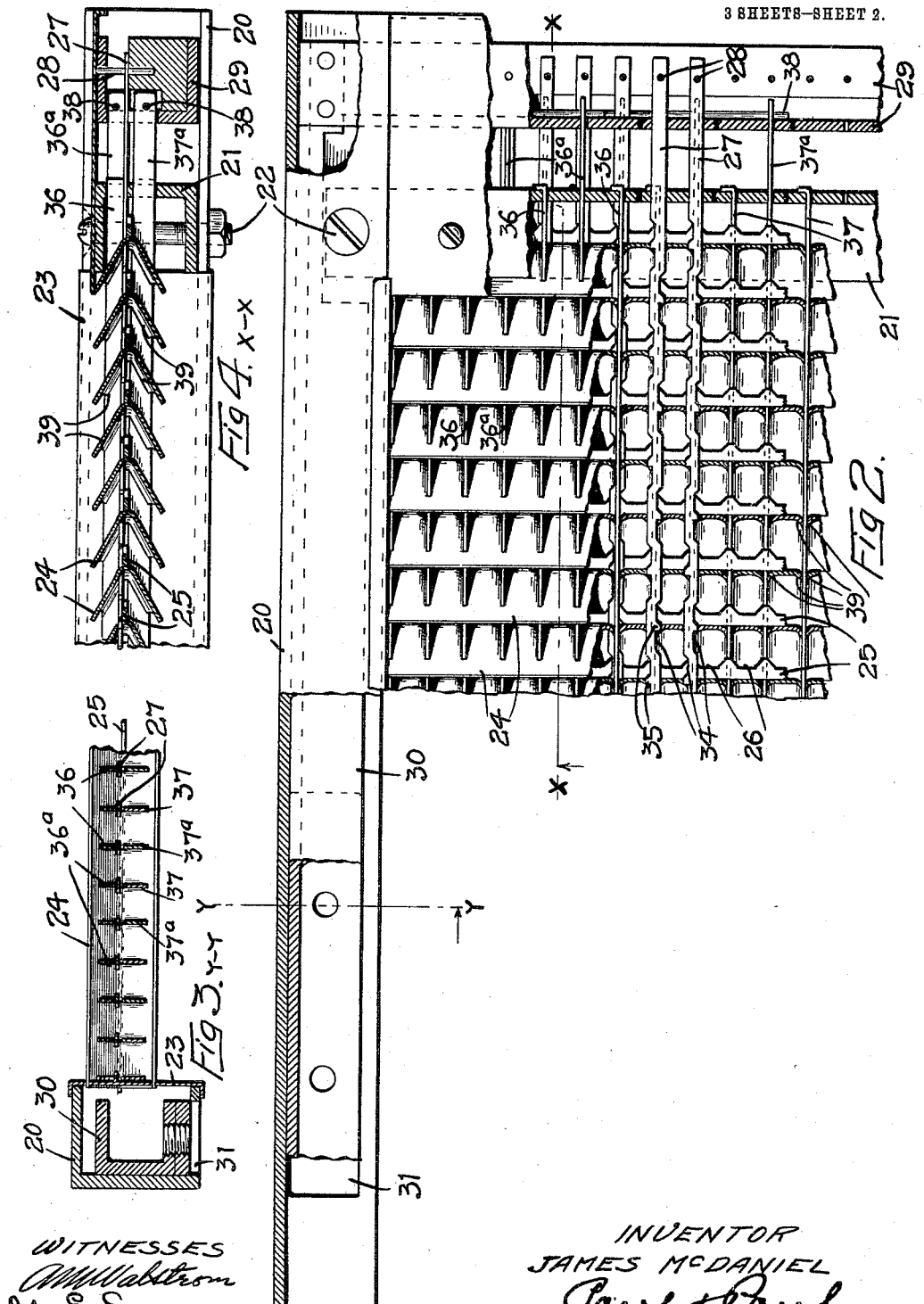

J. McDANIEL.
SIEVE.
APPLICATION FILED NOV. 14, 1910.

1,006,252.

Patented Oct. 17, 1911.

3 SHEETS—SHEET 3.

WITNESSES

INVENTOR
JAMES McDANIEL

UNITED STATES PATENT OFFICE.

JAMES McDANIEL, OF SEATTLE, WASHINGTON.

SIEVE.

1,006,252.  Specification of Letters Patent.  Patented Oct. 17, 1911.

Application filed November 14, 1910. Serial No. 592,376.

*To all whom it may concern:*

Be it known that I, JAMES McDANIEL, of Seattle, King county, Washington, have invented certain new and useful Improvements in Sieves, of which the following is a specification.

My invention relates to a sieve designed particularly for use as a grain separator, but capable of separating fine from a coarse material.

The object of my present invention is to improve the sieve shown and described in Letters Patent of the United States issued to me the fourth day of October, 1910, No. 971,770.

A further and particular object is to increase the capacity of the sieve of my former patent by enlarging the openings therethrough and permitting kernels of wheat to pass through in any position, two at a time, broadside, if they should happen to enter the opening in that position, but preventing the increase in the size of the opening from resulting in a greater freedom to the passage of the oat kernels. Generally speaking, the enlarging of the openings in the sieve to allow a greater volume of wheat to pass through in a given time would result in also permitting a corresponding increase in the passage of the oat kernels, or would impose less restriction upon the passage of the oat kernels than they would have in a screen with smaller holes. With my present invention, the holes are enlarged to allow the passage of a greater volume of wheat while the oat kernels, owing to the shape of the openings, are prevented from passing through.

My invention consists generally in a sieve, the openings of which are of such shape and size that wheat kernels can flow readily therethrough in any position they happen to be in while the oat kernels are checked and held back.

Further the invention consists in an angle sieve, the walls of the angle plates being rounded at the apexes of the angles.

Further the invention consists in rounding and filling the corners of the openings or making an obtuse angle at that point so that the end of an oat kernel cannot enter the corner any farther than the end of a kernel of wheat.

Further the invention consists in providing angle plates of such an angle that the openings between the plates will be sufficiently large to prevent clogging of the material which will pass through the screen above and at the same time the distance between the apex of one angle plate and the angle of the adjoining plate will be too short to allow the passage of an oat kernel.

Further the invention consists in a sieve having openings with a moving wall; that is, a wall that is movable with respect to the other walls of the same opening.

Further the invention consists in means in connection with each opening for dislodging the grain kernels or other material which under some conditions might lodge in the opening.

Further the invention consists in various constructions and combinations, all as hereinafter described and particularly pointed out in the claims.

Figure 6:
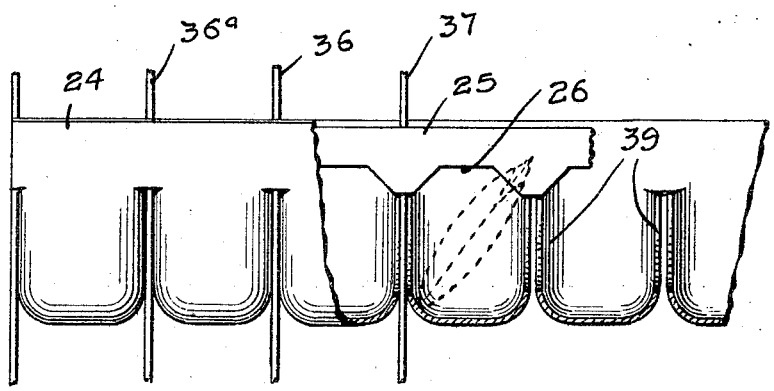

In the accompanying drawings forming part of this specification, Figure 1 is a longitudinal, vertical, sectional view of a separating machine with my invention applied thereto, Fig. 2 is a plan view of a portion of the sieve, showing the construction and arrangement of the pockets, Fig. 3 is a sectional view on the line $y$—$y$ of Fig. 2, Fig. 4 is a sectional view on the line $x$—$x$ of Fig. 2, Fig. 5 is an enlarged perspective view showing in detail the construction of the sieve, Fig. 6 is a plan view of a portion of the sieve partially in section, showing how a kernel of oats will be held back by the rounded corners from passing through the sieve.

In the drawing, 2 represents a separator of suitable size and construction, having a hopper 4, a feed roll 5, and a feed plate 6. A plate 7 governs the volume of feed from the hopper. 8 is a fan casing of ordinary construction, arranged within the casing of the machine and having a suction fan 9. This fan operates to remove from the sieve the small, light kernels of oats which may be no longer than a wheat kernel and might therefore pass through the sieve with the wheat, while the oat kernels that are longer than the wheat kernels will be separated by the sieve, as will hereinafter appear. All these parts are of any ordinary or preferred construction and no claim to novelty is made for them herein.

10 is a sieve shoe, supported at one end by links 11 and at the other by similar links 12 which, at their upper ends, are adjustable in curved guide-ways 13 by means of blocks 14 and lock nuts 15. By loosening these nuts and moving the blocks 14, the oscillating or vibratory movement of the shoe is controlled. Evidently, if the blocks 14 are adjusted, as shown in the drawing, the movement of the shoe will partake to a considerable degree of an up and down action while, if the blocks are moved toward the left so that the links 11 and 12 will be nearly vertical, the shoe will swing in nearly a horizontal plane. The movement of the shoe is effected in the usual way by means of a pitman-rod 16 and eccentric 17, operated from a suitable source of power, not shown.

In the upper part of the sieve shoe is the usual perforated metallic screen 18, upon which the material from the hopper is first delivered, the fine material, such as wheat and oats, passing through the perforations of the screen, while the coarse refuse is discharged at the lower end of the screen into the tailings spout 19. Assuming that the invention is to be used to separate oats from wheat and that the kernels have fallen through the perforations of the screen 18, I provide beneath this screen a sieve of novel and peculiar construction, which forms the subject matter of my present invention. I have shown in Figs. 2, 3, and 4 detailed views of this sieve, which clearly disclose its construction, and as all portions of the sieve are substantially the same, a clear idea may be obtained of its details and workings without the entire sieve being illustrated.

In experimenting with sieves of the construction of my patent above referred to, I found that oat kernels, though longer than the kernels of wheat, would sometimes pass through the sieve, owing to the fact that the oat kernels are pointed and would enter a corner of the sieve opening a greater distance than a wheat kernel could, and I also found that to enlarge the size of the openings for the purpose of increasing the capacity of the sieve would only make this condition worse, and make it easier for the oat kernels to pass through than before. It seemed desirable, therefore, to provide an opening of such shape that the pointed kernels of oats could not enter a corner of the opening any greater distance than the blunt end of a kernel of wheat, and I found also that if I could so restrict the entrance of an oat kernel into a corner of the sieve opening that I could at the same time enlarge the opening and increase the flow of the wheat kernels therethrough without at the same time allowing greater freedom for the passage of oats. With this purpose in view I have constructed a sieve which I will now describe in detail.

20 represents a bar, preferably of channel iron, mounted in the sieve shoe on one side of the sieve, a similar bar supporting the sieve on the opposite side of the sieve shoe. 21 represents an end bar, secured to the bar 20 by suitable means, such as the screws 22. A plate 23, preferably of sheet metal, is provided on each side of the sieve and has its edges outwardly turned, bearing on the flanges of the channel bar 20, as shown in Fig. 3, and in this plate the ends of the angle plates 24 are inserted and secured by any suitable means. These angle plates are preferably of sheet metal and are substantially V-shaped in cross section and instead of forming a sharp angle at the apexes of these plates I prefer to round or curve the inside walls so that the blunt end of a kernel of wheat will enter the angle just as far as the sharper end of a kernel of oats and in this way, if the space between the inside wall of the angle and the apex of the adjoining angle plate is only sufficient for the longest kernel of wheat to pass lengthwise, then it is evident a kernel of oats longer than the longest kernel of wheat, could not possibly pass through the opening in the same way and will be thrown out by the action of the sieve.

I prefer to provide transversely arranged plates 25 secured at their ends to the plates 23 and fitting snugly against the rounded apexes of the angle plates with recesses 26 which cause that side of the openings to conform substantially to the walls of the opposite side. As before stated, the distance between the edges of these plates and the inside angle of the adjoining angle plate is too short to permit the passage of the oat kernels, while permitting the wheat kernels to roll freely thereover.

Extending through the sieve transversely of the angle plates and preferably near the apexes thereof, are a series of strips or ribbons 27, preferably of thin sheet metal of suitable width. The ends of these ribbons are secured by pins 28 to a rail 29, a similar one being provided at the opposite end of the sieve. The rail 29 is secured to a side rail 30 that is fitted within the channel bar 20 and is connected through a slot 31 in the bar 20 with a rod 32, which is secured at one end to the frame of the machine and is pivotally connected at its other end to a block 33 that is bolted to the rail 30 by any suitable means. The rod 32 evidently will hold the rails 29 and 30 against longitudinal movement permitting, however, a relative movement of the sieve bars 21 through the action of the pitman rod and the eccentric 17. The ribbons 27 have recesses 34 in their edges forming shoulders 35 and as the ribbons are arranged flatwise in the sieve, it is evident that these shoulders or lugs will project into the adjoining pockets and the movement of the pocket walls back and forth with respect to these lugs, and the position of the ribbons and lugs substantially midway between the upper and under surfaces of the sieve, will agitate the material passing through the sieve and prevent it from lodging therein.

In addition to the ribbons 27 I also prefer to provide partition plates 36 and 36ª and 37 and 37ª disposed, respectively, above and below each ribbon and at right angles preferably to the plane of the ribbons, as shown clearly in Fig. 3. These plates are alternately stationary and movable; that is, referring to Fig. 2, the plate 37 at the bottom of the figure is shown with its end fastened in the bar 21. The next plate on the other side of the pocket, designated by numeral 37ª, extends through a slot in the bar 21 and into and through the rail 29, and is secured by means of a pin or wire 38 which passes through the end of the plate and through the corresponding ends of the other plates across the sieve. These plates 37ª will not move, therefore, with the sieve itself, but will form a surface or wall at the bottom of the opening with respect to which the remaining walls of the opening will be movable. The plates 36 and 36ª are similarly arranged above the ribbons 27, except that those plates which extend through to the rail 29 are preferably in staggered relation with respect to the corresponding plates at the bottom of the openings. That is, referring to Fig. 3, if the upper plate at the right hand end of the figure is attached to the rail 29, then the diagonally opposite plate on the other side of the opening below the angle thereof will be similarly mounted. The result is, there will be in each portion of an opening, above and below the angle thereof, a partition or wall which, with respect to the other walls of the opening, is relatively movable. These plates are shown clearly in Fig. 3 disposed above and below the ribbons 27, dividing the openings between the angle bars transversely and forming walls for said openings on two sides and coöperating with the ribbons to prevent oat kernels from assuming such a position which, if these plates were omitted, might enable an oat kernel of normal size to work through the sieve. These moving walls also coöperate to prevent material from lodging in the sieve openings.

The rounding of the corners of the sieve openings or the formation of an obtuse angle at that point might be accomplished in different ways, but I prefer to obtain this effect by means of lips 39 stamped out of the metal in forming the slots therein for the insertion of the plates 36, 37, 36ª and 37ª. These lips, as indicated in Figs. 2 and 4, extend across or bridge the corners of the openings and have rounded inner surfaces to contact with the kernels of grain and will allow a wheat kernel to enter the corner just as far as the sharper kernel of oats, and the distance between these lips and the edges of the transverse plates 25 being greater than the length of the longest kernel of wheat and less than the length of a normal kernel of oats, it follows that the wheat kernels will roll or slide freely through the openings and past the angles of the plates endwise, sidewise, and two at a time if it so happens, while the oat kernels, having insufficient room for passage, will be checked and thrown out. I have found by actual experience in the operation of this sieve that an opening of 5/16 of an inch will permit the passage of the largest kernels of wheat. Oat kernels, which are normally 1/16 of an inch longer than wheat kernels, being unable on account of the shape of the openings, as described, cannot pass through the openings. Should some of the oat kernels be shorter than the wheat kernels, they would usually be immature and comparatively light in weight and would be taken out by the air blast or, if they should escape this blast and pass through the sieve with the wheat, they can be easily removed later.

In this sieve I take advantage of the difference in length of normal wheat and oat kernels and provide sieve openings of such shape that the difference in shape of the ends of the kernels of wheat and oats will not in any way facilitate the passage of the oat kernels and at the same time the openings can be enlarged to increase the flow of the wheat.

In the operation of the sieve the material, such as mixed wheat and oats, is discharged upon the perforated plate above and the grain, falling through the openings in this plate, drops into the angular cells of the sieve beneath. These cells or passages are of sufficient width to allow wheat kernels to roll or slide downwardly, endwise, sidewise, one by one, or several at a time, as the case may be, the cells being open and unobstructed and of larger cross sectional area than usual in sieves of this type. The filling or bridging means in the corners of the cells prevent the pointed ends of the oat kernels from entering the corners any farther than the blunt ends of the wheat kernels, and as a normal kernel of oats is longer than a normal kernel of wheat it follows that if the cell or passage is of such form that the oat kernel, owing to its tapered end, has no advantage over the wheat kernel, by making the diameter of a passage or cell from corner to corner a little less than the length of the kernels of oats, they will contact with the walls of the passages and be thrown out by the movement of the sieve while the wheat kernels will flow easily and rapidly through the passages. If an oat kernel should enter a passage endwise and slide down to the apex of the angle, its forward end would contact with the rounded inner surface of one angle plate, while its rear end would rest upon the transverse plate at the apex of the adjoining angle plate, and the corners of the passage at the angle being filled, it will be practically impossible for an oat kernel to pass around the angle and flow on with the wheat unless it is an under-sized kernel which could be subsequently removed by the air blast.

I am aware that angle plate sieves have been used heretofore for separating oats from wheat but these sieves, owing to the fact that the oats could enter the corners of the passages a greater distance than the wheat kernels, necessarily had cells or passages comparatively small in cross sectional area and hence the capacity of the sieve was greatly reduced. In my improved construction the passages have a large cross sectional area, allowing the wheat kernels to flow through them in quantity while the oat kernels are separated and held back. In case an oat kernel should lodge between the corners of a passage the agitating wall sections will quickly dislodge them.

I do not wish to be confined to the material employed in the construction of this sieve or the details illustrated herein, as various modifications may be introduced without departing from the spirit of my invention.

I have described this sieve as adapted particularly for separating wheat and oats, but obviously it may also be used for separating other kinds of grain where advantage may be taken of the difference in length of the kernels or the difference in width of the ends of the kernels.

I claim as my invention:—

1. A sieve composed of angle plates and cross walls coöperating to form the sieve passages and disposed at an angle with each other, the meeting portions of said members being at an obtuse angle to permit grains of varying widths to enter the same distance therein.

2. A sieve composed of transverse and longitudinal plates intersecting one another to form sieve cells or passages and means bridging the corners formed by the intersection of said plates and permitting the blunt end of a wheat kernel to enter therein the same distance as the pointed end of a kernel of oats.

3. A sieve composed of angle plates spaced apart and in parallel relation and cross walls intersecting said plates, the meeting portions of said walls and plates having rounded corners.

4. A sieve comprising a series of parallel angle plates having rounded apexes forming obtuse angles between the flanges of said plates to permit the entrance therein of the blunt end of a kernel of wheat substantially the same distance as the pointed end of a kernel of oats, the distance from the wall forming the apex of an angle plate between the flanges of said plate to the opposing wall of an opening between the parallel plates being greater than the length of a normal kernel of wheat and less than the length of a normal kernel of oats, partition walls dividing the spaces between the angle plates into a series of angular cells or passages and means bridging the corners of said cells.

5. A sieve composed of a series of parallel angle plates having rounded apexes forming obtuse angles between the flanges of said plates to permit the entrance therein of the blunt end of a kernel of wheat substantially the same distance as the pointed end of a kernel of oats, plates having a longitudinal edge seated against the apexes of said angle plates, the distance from the wall forming the apex of an angle plate between the flanges of said plate to the plate seated against the apex of the contiguous angle plate being greater than the length of a normal kernel of wheat and less than the length of a normal kernel of oats, partition walls dividing the spaces between the angle plates into a series of angular cells or passages, and means bridging the corners of said cells.

6. A sieve having transverse and longitudinal walls inclosing the sieve openings, said transverse walls having slots therein to receive said longitudinal walls, the edges of said slots being bent inwardly to form rounded corners for the sieve openings.

7. A sieve composed of angle plates and partition walls intersecting said plates and inclosing the sieve openings, said angle plates having slots therein to receive said partition walls, the edges of said slots being inwardly turned and forming rounded corners for the sieve openings.

8. A sieve composed of angle plates spaced apart, partition walls dividing the spaces between the angle plates into a series of angular cells or passages, and plates seated against the apexes of said angle plates and projecting into said cells and bridging the corners formed by the intersection of said plates and said partition walls, the projecting edges of said plates being recessed.

9. A sieve having plates extending transversely thereof between its upper and under surfaces and projecting into the sieve openings, the projecting edges of said plates being recessed, for the purpose specified.

10. A sieve having openings therethrough, the longitudinal and transverse walls of which are relatively and normally movable in the operation of the sieve.

11. A sieve composed of angle plates and plates having straight edges on one side seated against the apexes of said angle plates and projecting into the openings in said sieve, the projecting edges of said transverse plates being recessed, and the edges of said recesses being curved or rounded, for the purpose specified.

12. A sieve composed of angle plates and transverse partition walls forming sieve openings, the longitudinal and transverse walls of said openings being relatively movable with the operation of said sieve.

13. A sieve having upper and lower partition walls between the openings therein, said walls being relatively movable.

14. A sieve composed of intersecting transverse and longitudinal walls and agitating means disposed in said longitudinal walls and relatively movable with respect thereto.

15. A sieve having longitudinal walls forming partitions between the openings therethrough, portions of said walls being relatively movable.

16. A sieve composed of intersecting transverse and longitudinal walls and agitating means having notched edges disposed in said longitudinal walls and relatively movable with respect thereto.

17. A sieve having intersecting transverse and longitudinal walls for the openings therethrough, the upper portion of a wall on one side of an opening, the lower portion of a wall on the other side of an opening, and the remaining walls of that opening being relatively movable.

18. A sieve composed of angle plates and partition walls intersecting said plates, said partition walls being composed of upper and lower sections which are relatively movable.

19. A sieve composed of angle plates and intersecting partitions therefor forming, with said angle plates, the walls of the openings through said sieve, the upper portion of a partition wall on one side of an opening, and the lower portion of a wall on the other side of the same opening, and the remaining walls of that opening, being relatively movable.

20. A sieve composed of angle plates and partition walls intersecting said plates, said partition walls being divided into upper and lower sections disposed respectively above and below the angles of said plates, some of the upper sections of said partition walls being relatively movable with respect to the other upper sections of the same walls.

21. A sieve composed of angle plates and intersecting partition walls inclosing the openings through the sieve, said partition walls being divided into upper and lower sections disposed respectively above and below the angles of said plates, some of the lower sections of said partition walls being relatively movable with respect to the other lower sections of the same walls.

22. A sieve composed of transverse and i·secting longitudinal walls inclosing the sieve openings, and means interposed between the upper and lower portions of said longitudinal walls and relatively movable with respect to said transverse walls.

23. A sieve comprising transverse and longitudinal walls inclosing the openings therethrough, means seated against said transverse walls and projecting into said openings, and means interposed in said longitudinal walls extending transversely of said projecting means and relatively movable with respect thereto.

24. A sieve having transverse walls and intersecting longitudinal walls inclosing the sieve openings, plates seated against said transverse walls and having recessed edges projecting into the sieve openings, and means extending transversely of said plates and sliding thereon, for the purpose specified.

25. A sieve composed of transverse and longitudinal walls inclosing the sieve openings, transverse plates projecting into the sieve openings and longitudinal plates having notched edges also projecting into said openings and relatively movable with respect to said transverse plates.

26. A sieve composed of transverse angle plates and intersecting longitudinal partitions inclosing the sieve openings, transverse plates seated against said angle plates and projecting into said openings, and longitudinal plates arranged transversely of said transverse plates and having lugs thereon, substantially as described.

27. A sieve composed of side and end bars and transverse angle plates supported thereby, side and end rails, longitudinal walls composed of upper and lower sections intersecting said angle plates above and below the apexes of the angles thereof, and forming with said angle plates the walls of the sieve openings, some of said longitudinal sections being movable with respect to the other sections.

28. A sieve composed of transverse angle plates and longitudinal partitions passing through said plates above and below the apexes of said angles, and an agitating means passing through the apexes of the angles of said transverse plates between the upper and lower sections of said partition plates.

29. A sieve composed of transverse and intersecting longitudinal walls inclosing the sieve openings and means intermediate to the upper and lower portions of said longitudinal walls and having notched edges and relatively movable with respect to said transverse walls.

30. A sieve composed of intersecting transverse and longitudinal walls, plates disposed in one of said walls and relatively movable with respect thereto and having notched edges projecting into the sieve openings separated by said walls.

31. A sieve composed of intersecting transverse and longitudinal walls, said longitudinal walls consisting of plates arranged edgewise and agitating plates disposed flatwise within said longitudinal walls and relatively movable with respect thereto.

32. A sieve composed of intersecting transverse and longitudinal walls, said longitudinal walls consisting of plates disposed edgewise and plates arranged flatwise in said longitudinal walls and having notched edges projecting into the sieve openings.

33. A sieve composed of transverse angle plates and intersecting longitudinal partitions, and agitating means interposed in said longitudinal partitions and projecting laterally, and relatively movable, with respect thereto.

34. A sieve composed of intersecting transverse and longitudinal plates forming cells or passages, the distance between a point of contact of a kernel of grain with a wall of a cell and the point of contact of an opposing wall of the same cell being less than the length of a normal kernel of oats and greater than the length of a normal kernel of wheat.

35. A sieve composed of intersecting transverse angle plates and longitudinal plates forming angular cells or passages, the distance taken on a section line through the apexes of said angle plates between a point of contact of a kernel of grain with the wall of a cell and the point of contact of an opposing wall of the same cell being less than the length of a normal kernel of oats and greater than the length of a normal kernel of wheat.

36. A sieve composed of angle plates spaced apart and partitions forming, with said angle plates, angular cells or passages, plates forming continuations of the apexes of said angle plates and having parts bridging the angles formed by said angle plates and said partitions, the distance between said parts and the diagonally opposite corner of the cell being less than the length of a normal kernel of oats and greater than the length of a normal kernel of wheat.

37. A sieve composed of angle plates spaced apart and in parallel relation, partitions intersecting said angle plates and forming therewith a series of angular cells or passages having obtuse angled corners, the distance between the diagonally opposite obtuse angled corners of said passages being less than the length of a normal kernel of oats and greater than the length of a normal kernel of wheat.

38. A sieve composed of interlocking longitudinal and transverse plates forming the walls of the sieve openings, said walls being relatively movable and preventing clogging of said openings in the operation of the sieve.

In witness whereof, I have hereunto set my hand this 12th day of November, 1910.

JAMES McDANIEL.

Witnesses:
   GENEVIEVE E. SORENSEN,
   C. H. REHFUSS.

---

Copies of this patent may be obtained for five cents each, by addressing the "Commissioner of Patents, Washington, D. C."